US007332123B2

(12) United States Patent
Jackson et al.

(10) Patent No.: US 7,332,123 B2
(45) Date of Patent: Feb. 19, 2008

(54) METHOD FOR MANUFACTURING COMPOSITE ARTICLES AND THE ARTICLES OBTAINED THEREFROM

(75) Inventors: Melvin Jackson, Niskayuna, NY (US); Bernard Bewlay, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 184 days.

(21) Appl. No.: 10/331,104

(22) Filed: Dec. 27, 2002

(65) Prior Publication Data

US 2004/0126266 A1 Jul. 1, 2004

(51) Int. Cl.
*B22F 3/03* (2006.01)
(52) U.S. Cl. .................. 419/66; 420/425; 420/580; 148/422
(58) Field of Classification Search .............. 419/5, 419/66
See application file for complete search history.

(56) References Cited

U.S. PATENT DOCUMENTS

| | | | | |
|---|---|---|---|---|
| 2,227,308 A | * | 12/1940 | Hildabolt | 419/2 |
| 4,008,023 A | * | 2/1977 | Wentzell | 425/78 |
| 4,247,333 A | * | 1/1981 | Ledder et al. | 106/38.9 |
| 4,663,241 A | * | 5/1987 | Doherty et al. | 428/547 |
| 4,698,205 A | * | 10/1987 | Oskarsson et al. | 419/5 |
| 4,703,620 A | * | 11/1987 | Niino et al. | 60/260 |
| 4,836,849 A | * | 6/1989 | Svedberg et al. | 75/245 |
| 4,989,664 A | * | 2/1991 | Roth | 164/361 |
| 5,445,787 A | * | 8/1995 | Friedman et al. | 419/38 |
| 5,470,524 A | * | 11/1995 | Krueger et al. | 419/5 |
| 5,579,532 A | * | 11/1996 | Edd | 419/2 |
| 5,833,773 A | * | 11/1998 | Bewlay et al. | 148/422 |
| 5,943,544 A | * | 8/1999 | Morita et al. | 419/5 |
| 5,960,249 A | * | 9/1999 | Ritter et al. | 419/6 |
| 5,972,269 A | * | 10/1999 | Barros et al. | 264/221 |
| 6,274,083 B1 | * | 8/2001 | Clark, III | 419/5 |
| 6,409,848 B1 | * | 6/2002 | Bewlay et al. | 148/422 |
| 6,419,765 B1 | | 7/2002 | Jackson et al. | 148/422 |
| 6,428,910 B1 | * | 8/2002 | Jackson et al. | 428/660 |
| 6,447,623 B1 | | 9/2002 | Jackson et al. | 148/668 |
| 6,453,536 B1 | * | 9/2002 | Muller et al. | 29/423 |
| 6,551,372 B1 | * | 4/2003 | Ewing et al. | 75/246 |
| 6,557,621 B1 | * | 5/2003 | Dierksmeier et al. | 164/369 |
| 6,692,586 B2 | * | 2/2004 | Xu et al. | 148/421 |
| 6,847,699 B2 | * | 1/2005 | Rigali et al. | 378/143 |
| 6,974,508 B1 | * | 12/2005 | Gabb et al. | 148/428 |

FOREIGN PATENT DOCUMENTS

WO WO 93/17820 * 9/1993

* cited by examiner

*Primary Examiner*—Roy King
*Assistant Examiner*—Christopher Kessler
(74) *Attorney, Agent, or Firm*—Fletcher Yoder

(57) ABSTRACT

A method of molding an article comprises inserting a mandrel into the cavity of the mold; placing a niobium based refractory metal intermetallic composite powder into a cavity of a mold; consolidating the niobium based refractory metal intermetallic composite around the mandrel; and chemically removing the mandrel from the composite. In one embodiment, the molded article comprises a turbine component for use in a turbine system.

13 Claims, 1 Drawing Sheet

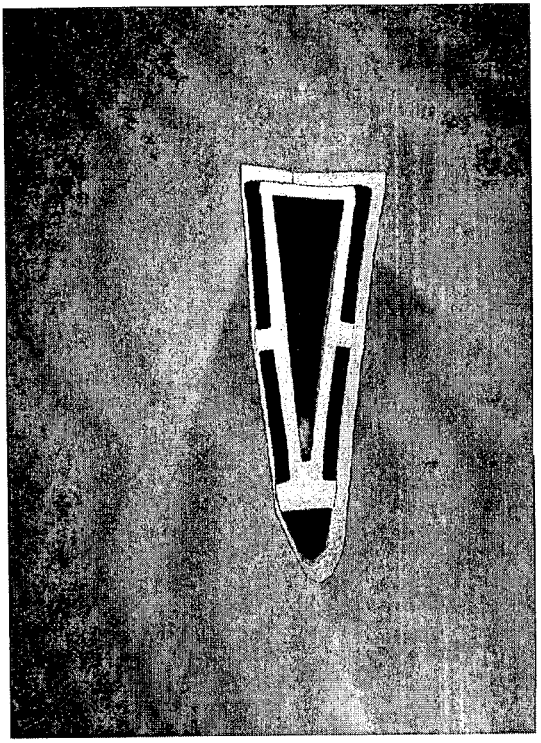
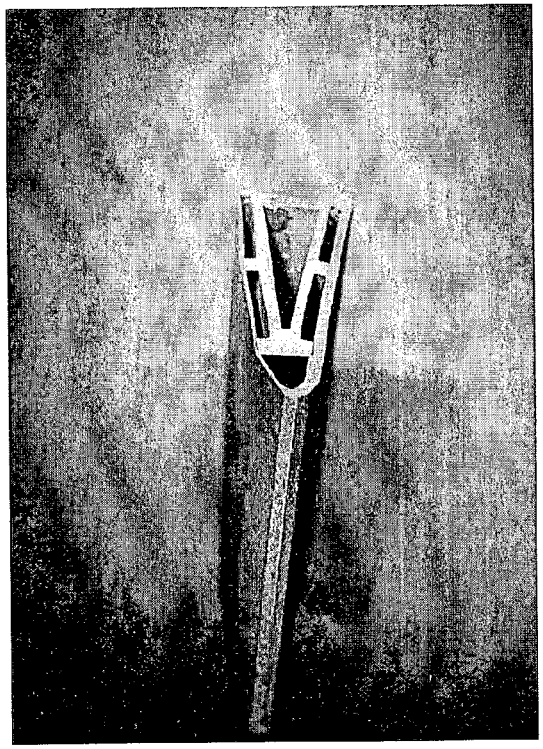
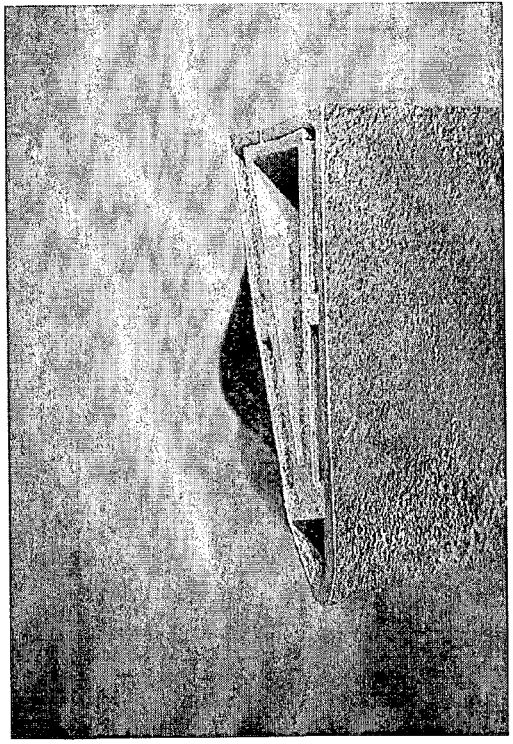
Figure

METHOD FOR MANUFACTURING COMPOSITE ARTICLES AND THE ARTICLES OBTAINED THEREFROM

BACKGROUND

This disclosure generally relates to turbine systems, and in particular to methods used in manufacturing components for turbine systems.

Turbines are devices that generate rotary mechanical power from the energy in a stream of moving fluid. Turbines may be used in aircraft, watercraft (both marine and fresh water), various types of land-based turbines, and the like. Turbine components are generally fabricated from superalloys, for example alloys of nickel (Ni), iron (Fe), or cobalt (Co). Temperature constraints of such superalloys, particularly single-crystal nickel-based superalloys, however, limit their use in turbine engines in which extreme temperature conditions may be experienced.

In order to overcome the temperature limitations of these superalloys, newer materials based on niobium (Nb) have been developed. The niobium based materials are termed niobium based refractory metallic-intermetallic composites (hereinafter Nb based RMICs). The Nb based RMICs have melting temperatures greater than 1700° C., which exceeds the current temperature service limits of Ni-based superalloys.

The high melting temperatures of the Nb based RMICs however presents some problems during the manufacturing of components having intricate geometries, especially components for turbine systems. For example, when intricate components are sought to be manufactured through processes such as casting, preferred micro-structures within the component are often not achieved because of a lack of control over the solidification conditions. Another drawback of components manufactured from Nb based RMICs is the additional internal machining required after molding to create hollow structures or other complex geometries. The additional post-molding machining increases the time of production as well as the expenditure incurred in the manufacture of such components because of the complex nature of the production equipment. It is therefore generally desirable to be able to manufacture turbine components that have long lifetimes at service temperatures of about 700° C. to about 1370° C., and that can have complex geometries without substantial additional post-molding machining. It is also desirable to have a turbine system having components constructed from Nb based RMIC composites wherein intricate features may be achieved in a simple manufacturing process and wherein suitable control of the microstructure is achieved during processing.

SUMMARY

A method of molding an article comprises inserting a mandrel into the cavity of the mold; placing a niobium based refractory metal intermetallic composite powder into a cavity of a mold; consolidating the niobium based refractory metal intermetallic composite around the mandrel; and chemically removing the mandrel from the composite.

In one embodiment, a molded article comprises a turbine component for use in a turbine system.

The above described and other features are exemplified by the following FIGURE and the detailed description.

BRIEF DESCRIPTION OF DRAWING

The FIGURE shows several views of an airfoil manufactured by hot isostatic pressing of an Nb based RMIC powder, wherein the mandrel is subsequently leached out.

DETAILED DESCRIPTION

Disclosed herein is an advantageous method for manufacturing articles from high temperature materials such as Nb based RMICs. The method permits the manufacture of articles having complex shapes and geometries by utilizing mandrels prepared from materials that can be chemically removed from the composite at any desired point during the manufacturing process. Chemically removing the mandrel reduces the time consumed in separate post-molding machining operations. Additionally, it minimizes the use of complex and costly equipment that are used to manufacture complex internal surfaces. Further, since this method also permits the manufacturing of articles from a composite powder, this method allows the manufacture of articles having property gradients such that any parts of the component that are subjected to higher stresses and temperatures may be constructed of materials that withstand these stresses and temperatures, while other parts may be constructed of materials having properties more suited to their utility.

The Nb based RMICs that may be used to form the articles generally comprise titanium, hafnium, silicon, chromium, and niobium. The Nb based RMICs preferably comprise about 19 to about 24 atomic percent titanium, about 1 to about 5 atomic percent hafnium, about 11 to about 22 atomic percent silicon, about 5 to about 14 atomic percent chromium, and a balance of niobium, based on the total composition of the Nb based RMICs. More preferably, the Nb based RMICs comprise about 19 to about 24 atomic percent titanium, about 1 to about 5 atomic percent hafnium, up to about 7 atomic percent tantalum, about 11 to about 22 atomic percent silicon, up to about 6 atomic percent germanium, up to about 12 atomic percent boron, about 5 to about 14 atomic percent chromium, up to about 4 atomic percent iron, up to about 4 atomic percent aluminum, up to about 3 atomic percent tin, up to about 3 atomic percent tungsten, up to about 3 atomic percent molybdenum, and a balance of niobium, based on the total composition of the Nb based RMICs. Most preferably, silicon, germanium, and boron together comprise about 11 to about 25 atomic percent of the Nb based RMIC, iron and chromium together comprise about 5 to about 18 atomic percent of the Nb based RMIC, and the ratio of the sum of atomic percentages of niobium and tantalum present in the Nb based RMIC to the sum of atomic percentages of titanium and hafnium in the Nb based RMIC is about 1.4 to about 2.2, i.e., 1.4<(Nb+Ta):(Ti+Hf)<2.2.

In one method of manufacturing an article, a mold having the geometry and dimensions of the article to be manufactured is filled with a Nb based RMIC. A mandrel having a desired shape may then be inserted into the composite contained in the mold. The insertion of the mandrel into the composite is generally undertaken in order to create channels, passages, tunnels, various hollow geometries (e.g., spheres, ellipsoids, cubes, and the like), cooling plenums, and the like, either on the surface or within the bulk of the desired molded component. The insertion of the mandrel into the composite also permits the manufacture of complex structures having double walls. The mandrel as well as the mold generally comprise a material that may be leached away or dissolved away by chemical means and is preferably capable of withstanding the temperature of any process that the mold and the composite contained therein may be subjected to. The mandrel and mold may also be removed by reactive dissolution, wherein it is first reacted with a compatibilizer in order to subsequently facilitate the process of dissolution.

The mandrel as well as the mold may generally be derived from iron-base alloys (e.g., plain carbon steels, invar, kovar), monel, molybdenum and copper-based alloys, oxides (e.g., alumina, zirconia, stabilized zirconia, mullite and other alumina-silica ceramic) as well as combinations comprising at least one of the foregoing metals and oxides. The mandrel may be a solid shape, especially when used to define interior complex cavities in the article. The mandrel may alternatively be a porous powder insert where the consolidation of the composite powder used to form the desired article would now be subjected to deformation away from the porous powder insert and towards the solid mold.

The mandrels may also be coated with a thin layer of an inert non-reactive material if the time and temperature of processing might risk interaction between mandrel and the composite forming the article. The mandrel may be inserted into the mold prior to insertion of the composite into the mold or after the insertion of the composite into the mold. The mandrel may comprise either a single piece or several pieces that may be inserted into the composite either simultaneously or sequentially. In similar fashion, the mandrels may be chemically removed from the composite simultaneously or sequentially. Other operations may be performed on the composite during the process of removal of the mandrel if so desired, such as for example, drilling, milling, slotting, and the like.

The use of chemically removable mandrels in the process of molding permits the design of complicated internal shapes and geometries in the various types of manufactured articles. In particular it allows the development of light weight articles for turbine systems. It preferably permits the development of turbine components for turbine systems having property gradients such that the parts of the turbine component that are subjected to higher stresses and temperatures may be constructed of materials that withstand these stresses and temperatures while other parts may be constructed of materials having properties more suited to their utility. These property gradients may be smooth or uniform variations in properties such as tensile strength, thermal resistance, chemical resistance, electrical resistance, impact strength, and the like, as well as, combinations of these properties. Alternatively it may also be desirable to vary properties in accordance with mathematical step functions, where adjacent sections of a particular turbine component have large differences in properties, depending upon the desired function.

Chemicals that are suitable for removal of the metal mandrels and/or metal molds are nitric acid solutions. Ceramics mandrels are generally chemically removed, while many of the ceramics are attacked by hot sodium or potassium hydroxide solutions. Care should being taken to choose leaching solutions that leave the Nb based RMIC composite intact without any damage.

The composite may be inserted into the mold in different forms, such as for example, a powder, or a powder in combination with a casting, a pre-formed ingot, a pre-formed powder, and combinations comprising at least one of the foregoing forms. Generally powder metallurgy based processes are preferred for preparing composites wherein the mandrel and/or the mold is chemically removed from the composite. When the composite is added to the mold in the form of a powder it may be consolidated by powder metallurgy based methods including, but not limited to, hot pressing, hot isostatic pressing, sintering, hot vacuum compaction, and the like. The powder may be consolidated with pre-formed shapes and forms such as a casting, a pre-formed ingot, a pre-formed powder, and combinations comprising at least one of the foregoing forms so as to capture it in the final article, and to metallurgically bond to it by diffusional processes. Hot isostatic pressing is generally preferred for its ability to facilitate substantially reduced porosity and reduced shrinkage in the production of such components. Generally, process conditions for hot isostatic pressing are chosen so as to achieve consolidation wherein the final composite has a porosity less than or equal to about 10 volume percent, and more preferably less than or equal to about 2 volume percent, based on the total volume of the composite article. This process generally involves the application of high pressure and temperatures through the medium of a pressurizing gas to remove internal porosity and voids, thus increasing density and improving the properties of the resultant composite. Hot isostatic pressing is generally conducted at temperatures of greater than or equal to about 1000° C., preferably greater than or equal to about 1200° C., more preferably greater than or equal to about 1400° C. The gas pressures utilized during hot isostatic pressing are generally greater than or equal to about 100 mega Pascals (MPa), preferably greater than or equal to about 150 MPa, and more preferably greater than or equal to about 200 MPa. Preferred gases used for the process include, but are not limited to, argon, nitrogen, helium, xenon and combinations comprising one of the foregoing.

The powder may be of a single desired composition or alternatively the powder may be a mixture containing refractory elements in one powder composition mixed with elements that promote a refractory intermetallic in another powder composition. In the case of a mixture, the powders are mixed in a proportion so as to achieve the desired overall composition having the desired properties. Different powder compositions may be employed in different parts of the composite structure. As described above, the process is a single-step process. Alternatively, the features of the interior of the composite article may be consolidated in a first step while the features of the exterior of the composite article may be consolidated around the first part in a second step.

The particle sizes for powders that are to be subjected to consolidation are generally about 2 micrometers to about 75 micrometers. Within this range a particle size of about 5 micrometers to about 45 micrometers is preferred, with a particle size of about 10 micrometers to about 38 micrometers being more preferred. The powder particle sizes are generally selected so as to minimize any phase segregation as well as to generate tough composites having a higher atomic percentage of the silicide component. For example, in niobium based alloys, by choosing initial powder particle sizes of about 25 micrometers to about 45 micrometers for the silicide, and about 5 micrometers to about 15 micrometers for the metal phase, it is possible to generate composites having 70 atomic percent silicide with the metal being distributed in the form of a network surrounding the silicide phase. High energy ball milling is often utilized to achieve a coating of the metallic niobium powder on the surface of the intermetallic powder. Such distributions can provide a material with useful fracture toughness at silicide percentages that would otherwise have defects from processing that would result in a very low fracture toughness of less than or equal to about 10 kilograms per square inch-inch$^{0.5}$ (ksi·in$^{0.5}$). Additionally, selecting the size of the starting powder and designing the correct deformation reduction during consolidation may also control the grain size of the composite structure.

The light weight articles derived from processes such as hot isostatic pressing, may be subsequently coated with an environmentally resistant coating in order to provide oxidation resistance to the Nb based RMICs substrates (hereinafter "substrates") that define the articles. In general, the environmentally resistant coating is crystalline and has a crystalline content greater than or equal to about 60 weight percent (wt %), preferably greater than or equal to about 80 wt %, and most preferably greater than or equal to about 95 wt %, based on the total weight of the composition. The thickness of the environmentally resistant coating is about 10 to about 200 micrometers. Within this range, a thickness of greater than or equal to about 15 micrometers, preferably greater than or equal to about 20 micrometers, and most preferably greater than or equal to about 25 micrometers is desirable. Within this range, a thickness of less than or equal to about 175 micrometers, preferably less than or equal to about 150 micrometers and most preferably less than or equal to about 125 micrometers is desirable. As defined herein the environmentally resistant coating is one that will provide increased resistance to oxidation at temperatures of about 1090° C. to about 1370° C. and/or increased resistance to pesting at temperatures of about 760° C. to about 980° C.

In addition to the environmentally resistant coating, a thermal barrier coating may be applied to the Nb based RMIC composite. The thermal barrier coating may be preferably deposited onto substrate by an electron beam physical vapor deposition (EB-PVD) or a thermal spray process such as air plasma spray, to a thickness of about 50 microns to about 400 microns. The thermal barrier coating may comprise materials such as, for example, zirconia, zirconia stabilized by the addition of other metals, such as yttrium, magnesium, cerium, and the like, zircon, mullite, and combinations comprising at least one of the foregoing materials, or other refractory materials having similar properties.

In the case of turbine components, once the thermal barrier coatings and environmentally resistant coatings have been applied to the component, the thermal barrier coated turbine component may be installed in a turbine system. This method of making turbine components using a chemically removable mandrel offers a number of advantages that are not easily achieved by other methods. For example, turbine components having complex internal and external geometries may be manufactured in a single step. Additional post-molding machining is minimized. Graded structures may also be manufactured by using different alloy composition powders at different regions of the airfoil. Further, the scale of components is not limited by casting segregation, and large changes in the cross sectional area of the component are not likely to lead to cracking, as can occur in castings.

The powder metallurgy approach allows independent engineering of the sizes of both the silicide and metallic phases. The Nb based RMICs can be deformed only at very high temperatures greater than 1400° C. A major advantage of the powder metallurgy approach is that it allows the scale of the composite structure to be controlled by selecting the size of the starting powder and designing the correct deformation reduction during consolidation. In cast alloys the scale of the structure is controlled by the solidification conditions and therefore affords less flexibility than with the powder metallurgy approach. During casting, the scale of the phases increases with increasing ingot size, and larger size intermetallics (grains) lead to a degradation in damage tolerance and fatigue characteristics, while for the articles derived using a powder metallurgy approach, the scale of the intermetallic is independent of the scale of the starting workpiece. The powder metallurgy approach also allows elimination of solidification segregation, which can be a significant issue in alloys containing large amounts of titanium, due to the partitioning coefficient of titanium from the solid to the liquid. The powder metallurgy approach also allows the opportunity to pre-select the phase chemistry required for the operating temperatures. In solidification processes this chemistry is pre-influenced by the solidification path.

The following examples, which are meant to be exemplary, not limiting, illustrate compositions and methods of manufacturing some of the various embodiments of the environmentally resistant coatings using various materials and apparatus.

EXAMPLES

Example 1

In this example, a hollow airfoil as shown in the FIGURE was produced from an Nb based RMIC powder by hot isostatic processing. The Nb based RMIC powder was of the composition shown in Table 1 below.

TABLE 1

| Component | Atomic percent |
| --- | --- |
| Niobium (Nb) | 50 |
| Silicon (Si) | 18 |
| Titanium (Ti) | 23 |
| Hafnium (Hf) | 2 |
| Chromium (Cr) | 4 |
| Aluminum (Al) | 3 |

A mandrel made of invar material was inserted into the mold. The mold was then filled with the Nb based RMIC powder, powder and subjected to hot isostatic processing at a temperature of 1200° C. The invar mandrel was chosen for its ability to withstand the temperatures and pressures utilized during the hot isostatic process as well as to minimize the mismatch in thermal coefficient expansion between the mandrel and the Nb based RMIC. Argon gas having a pressure of about 200 MPa was utilized during the hot isostatic pressing. After the pressing was completed, the mold along with the pressed component was cooled to room temperature, following which the invar mandrel was leached out in a solution of 30% nitric acid in water for a time period of 10 hours.

In the case of turbine components, the above-described methods of making turbine components and coating them with environmentally resistant coatings have a number of advantages over other methods described in the prior art. For example, the manufacture of turbine components from Nb based RMICs, wherein a chemically removable mandrel is utilized during the molding, allows for the production of hollow components with complex internal shapes and geometries. Components having double wall structures may also be produced by this method. Chemically removing the mandrel after molding or sintering of the turbine components reduces the time consumed in separate post-molding machining operations. Additionally, it minimizes the use of complex and costly equipment that are used to manufacture complex internal surfaces.

In addition, the ability to utilize hot isostatic pressing, hot pressing or sintering of Nb based RMIC powders in conjunction with a chemically removable mandrel for manufacturing turbine components permits the manufacture of airfoils and blades having graded structure and properties. The approach involves powder consolidation at high pressure and high-temperature to generate a composite article with a selected geometry and controlled microstructure. For example, an alloy with lower strength but higher oxidation and wear resistance can be used at the tip of the airfoil. In addition, an alloy with improved low-temperature strength and high damage tolerance can be used in the dovetail (at the root) where a reduced wear resistance may be adequate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of molding an article comprising:
   inserting a mandrel into the cavity of the mold, wherein the mandrel comprises at least one of invar, kovar, monel, carbon steel, alumina, zirconia, stabilized zirconia, zircon, or mullite;
   placing a niobium silicide based refractory metal intermetallic composite powder into a cavity of a mold;
   consolidating the niobium suicide based refractory metal intermetallic composite around the mandrel; and
   chemically removing the mandrel out of the composite.

2. The method of claim 1, further chemically removing the mold from the composite.

3. The method of claim 1, wherein the niobium silicide based refractory metal intermetallic composite is a powder, a powder in combination with a casting, a powder in combination with a pre-formed ingot, a powder in combination with a pre-formed powder, or a combination comprising at least one of the foregoing forms.

4. The method of claim 1, wherein the niobium silicide based refractory metal intermetallic composite comprises titanium, hafnium, silicon, chromium, and niobium.

5. The method of claim 1, wherein chemically removing the mandrel out of the composite is by leaching, dissolution or reactive dissolution.

6. The method of claim 1, wherein the niobium suicide based refractory metal intermetallic composite comprises: about 19 to about 24 atomic percent titanium; about 1 to about 5 atomic percent hafnium; up to about 7 atomic percent tantalum; about 11 to about 22 atomic percent silicon; up to about 6 atomic percent germanium; up to about 12 atomic percent boron; about 5 to about 14 atomic percent chromium; up to about 4 atomic percent iron; up to about 4 atomic percent aluminum; up to about 3 atomic percent tin; up to about 3 atomic percent tungsten; up to about 3 atomic percent molybdenum; and a balance of niobium, based on the total composition of the niobium silicide based refractory metal intermetallic composite.

7. The method of claim 5, wherein the ratio of a sum of atomic percentages of niobium and tantalum present in the niobium silicide based refractory metal intermetallic composite to a sum of atomic percentages of titanium and hafnium in the niobium suicide based refractory metal intermetallic composite has a value of about 1.4 to about 2.2, wherein silicon, germanium, and boron together comprise an amount of about 11 to about 25atomic percent of the niobium silicide based refractory metal intermetallic powder, and wherein iron and chromium together comprise about 5 to about 18 atomic percent of the niobium silicide based refractory metal intermetallic powder.

8. The method of claim 1, wherein the consolidating of the composite is accomplished by hot pressing, hot isostatic pressing, sintering, hot vacuum compaction, capture of ingot casting in a powder followed by directional solidification, ingot casting followed by thermo-mechanical treatment, chemical vapor deposition, physical vapor deposition or combinations comprising at least one of the foregoing processes of consolidation.

9. The method of claim 1, wherein the mandrel and/or the mold comprises at least one of invar, kovar, monel, carbon steel, alumina, zirconia, stabilized zirconia, zircon, or mullite.

10. The method of claim 1, wherein the chemically removing the mandrel comprises extracting the mandrel with a chemical solution of either nitric acid, hot sodium hydroxide or hot potassium hydroxide.

11. The method of claim 1, wherein the article is a turbine component.

12. The method of claim 11, wherein the turbine component is selected from the group consisting of rotating blades, non-rotating vanes, shrouds, nozzles, and combustors.

13. The method of claim 11, wherein the turbine component is part of an aircraft turbine system, a land-based turbine system or a watercraft turbine system.

* * * * *